United States Patent
Shaikh et al.

(10) Patent No.: US 9,015,859 B2
(45) Date of Patent: Apr. 21, 2015

(54) CONTEXTUAL USE AND EXPIRATION OF DIGITAL CONTENT

(75) Inventors: Khurshidali Shaikh, Mumbai (IN); Anoop Balakunthalam, Bangalore (IN); Ravi Petlur, Bangalore (IN); Shafeeq Ahmed, Gulbarga (IN); Gaurav Soni, Bangalore (IN)

(73) Assignee: Empire Technology Development LLC, Wilmington, DE (US)

( * ) Notice: Subject to any disclaimer, the term of this patent is extended or adjusted under 35 U.S.C. 154(b) by 145 days.

(21) Appl. No.: 13/635,632

(22) PCT Filed: Mar. 30, 2012

(86) PCT No.: PCT/IB2012/051549
§ 371 (c)(1),
(2), (4) Date: Sep. 17, 2012

(87) PCT Pub. No.: WO2013/121251
PCT Pub. Date: Aug. 22, 2013

(65) Prior Publication Data
US 2013/0139269 A1 May 30, 2013

(30) Foreign Application Priority Data
Feb. 15, 2012 (IN) .............................. 562/CHE/2012

(51) Int. Cl.
*G06F 21/10* (2013.01)
*H04L 29/06* (2006.01)
*H04N 21/4627* (2011.01)
*H04N 21/8355* (2011.01)

(52) U.S. Cl.
CPC .............. *G06F 21/10* (2013.01); *H04L 63/107* (2013.01); *H04N 21/4627* (2013.01); *H04N 21/8355* (2013.01); *H04L 2463/101* (2013.01)

(58) Field of Classification Search
None
See application file for complete search history.

(56) References Cited

U.S. PATENT DOCUMENTS

| | | | |
|---|---|---|---|
| 7,610,051 B2 * | 10/2009 | Dunko et al. | 455/456.1 |
| 8,325,747 B2 * | 12/2012 | Khivesara et al. | 370/401 |
| 2006/0206432 A1 * | 9/2006 | Russell et al. | 705/57 |
| 2007/0281692 A1 * | 12/2007 | Bucher et al. | 455/435.1 |
| 2007/0299737 A1 | 12/2007 | Plastina | |
| 2008/0108437 A1 | 5/2008 | Kaarela et al. | |
| 2008/0155109 A1 * | 6/2008 | Khedouri et al. | 709/229 |

(Continued)

FOREIGN PATENT DOCUMENTS

WO  PCT/IB/2012/051549  3/2011

OTHER PUBLICATIONS

International Searching Authority, International Search Report and Written Opinion of the International Searching Authority for PCT/IB2012/051549, Aug. 21, 2012.

(Continued)

*Primary Examiner* — Kaveh Abrishamkar
*Assistant Examiner* — Janusz Kusyk
(74) *Attorney, Agent, or Firm* — Jensen & Puntigam, PS

(57) ABSTRACT

Technologies related to contextual use and expiration of digital content are generally described. In some examples, a receiving device may connect with a sponsoring device having the digital content. A relationship property defines a relationship context between the receiving device and the sponsoring device. The receiving device may receive the digital content from the sponsoring device and use the digital content so long as allowed, as determined with reference to the relationship property.

22 Claims, 9 Drawing Sheets

(56) References Cited

U.S. PATENT DOCUMENTS

| | | | |
|---|---|---|---|
| 2010/0058062 A1* | 3/2010 | Lida et al. | 713/171 |
| 2010/0082784 A1* | 4/2010 | Rosenblatt et al. | 709/222 |
| 2011/0029610 A1 | 2/2011 | Chao et al. | |
| 2011/0077026 A1 | 3/2011 | Cousins et al. | |
| 2011/0304685 A1 | 12/2011 | Khedouri | |
| 2012/0315846 A1* | 12/2012 | Gartner et al. | 455/41.1 |

OTHER PUBLICATIONS airlinetrends.com, "German leisure carrier Condor first to launch wireless IFE system", http://www.airlinetrends.com/2011/03/18/condor-wireless-inflight-entertainment, Mar. 18, 2011.

Saroiu, S., and Wolman, A., "Enabling New Mobile Applications with Location Proofs," Proceedings of the 10th workshop on Mobile Computing Systems and Applications, Article No. 3, pp. 6, ACM (2009).

* cited by examiner

CONTEXTUAL USE AND EXPIRATION OF DIGITAL CONTENT

CROSS-REFERENCE TO RELATED APPLICATIONS

The present application is the US national stage filing under "35U.S.C. §371" claiming priority to the International application PCT/IB2012/051549, filed on Mar. 30, 2012, entitled "CONTEXTUAL USE AND EXPIRATION OF DIGITAL CONTENT", which claims priority to India Patent Application Number 562/CHE/2012, filed Feb. 15, 2012.

BACKGROUND

Unless otherwise indicated herein, the materials described in this section are not prior art to the claims in this application and are not admitted to be prior art by inclusion in this section.

Mobile computing devices such as smart phones, tablets and laptop computers are ubiquitous. These devices are capable of connecting to networks to download and use digital content, as well as interact with other devices. Users rely on mobile devices and the digital content accessed thereby, for their work as well as leisure activities. However, Wide Area Network (WAN) connections, which provide access to the internet and/or other networks facilitating access to large amounts of digital content, are not always available. For example, WAN connectivity is often unavailable in vehicles such as cars, buses, airplanes, trains and boats, as well as in remote areas and areas of poor wireless transmission. Meanwhile, in many areas lacking WAN connectivity, mobile devices may be able to connect to one or more nearby networks and/or devices.

SUMMARY

The present disclosure describes technologies including devices, methods, and computer readable media relating to contextual use and expiration of digital content. Some example computing devices may comprise receiving devices configured to receive and display digital content from a sponsoring device. Receiving devices may comprise a processor, a memory, a communication device, and an authenticator configured to detect a relationship property defining a relationship between the receiving device and the sponsoring device and to allow and disallow displaying the digital content by the receiving device, based on the relationship property. For example, when the relationship property indicates that the receiving device is one or more of: directly connected to the sponsoring device, connected to a Local Area Network (LAN) comprising the sponsoring device, and within a predefined maximum distance from the sponsoring device, displaying the digital content may be allowed, while conversely, if the relationship property indicates that the receiving device is one or more of not directly connected to the sponsoring device, not connected to a LAN comprising the sponsoring device, and not within a predefined maximum distance from the sponsoring device, displaying the digital content may be disallowed.

The digital content may comprise, for example, an application, a video file, an audio file, a text file, a file stream, or any other type of file. The digital content may comprise a multi-user application that enables interaction between a user of the receiving device and a user of the sponsoring device. The receiving device may be configured send and receive digital content interaction instructions to and from the sponsoring device. The digital content received from the sponsoring device may be encrypted, and the authenticator may be configured to allow displaying the digital content after taking appropriate security measures, for example, validating a decryption key using the relationship property and decrypting the digital content.

In some embodiments, the receiving device may be configured to receive the digital content and the authenticator from a sponsoring device, and to load and execute the authenticator in response to an instruction received from the sponsoring device. In some embodiments, the receiving device may comprise an operating system that includes the authenticator. In some embodiments, the receiving device may be configured to load and execute an auxiliary operating system, and to load and execute the digital content in the auxiliary operating system, in response to an instruction received from the sponsoring device along with the digital content. In some embodiments, the receiving device may be configured to receive, from the sponsoring device, a screen feed comprising the digital content.

The receiving device may comprise an operating system that includes a local marketplace tool configured to discover, aggregate, and display digital content items available from one or more sponsoring devices for which a relationship property defining a relationship between the receiving device and the sponsoring devices allows displaying the digital content items by the receiving device. The receiving device may comprise a payment manager configured to receive payment information in consideration for displaying the digital content by the receiving device. Also, the receiving device may be configured to provide an opportunity to acquire the digital content from a source other than the sponsoring device when displaying the digital content by the receiving device is disallowed.

Some example methods and computer readable media may comprise instructions configured to implement discovering, by a receiving device, digital content available from one or more sponsoring devices, wherein the sponsoring devices are those for which a relationship property indicates that the receiving device is one or more of: directly connected to the sponsoring device, connected to a LAN comprising the sponsoring device, and within a predefined maximum distance from the sponsoring device. The discovered digital content may be aggregated and displayed to a user, and a user selection may be received by the receiving device. A request for the digital content may be sent to the sponsoring device having the selected digital content, and the receiving device may receive the selected digital content from the sponsoring device. An authenticator may detect a relationship property defining a relationship between the receiving device and the sponsoring device providing the digital content and the authenticator may allow and/or disallow displaying a digital content item as described above. The received digital content may be allowed to be displayed by the receiving device so long as the detected relationship property continues to allow such displaying, and periodic relationship property status checks may be made to ensure the relationship property continues to allow such displaying.

Some example receiving devices configured to receive digital content from sponsoring devices may comprise a processor, a memory, a communication device, and a local marketplace tool. The local marketplace tool may be configured to discover, aggregate, and display digital content item information identifying digital content items available from sponsoring devices for which a relationship property allows displaying the digital content items by the receiving device. For example, as introduced above, the relationship property may allow displaying the digital content items by the receiving device when the receiving device is one or more of directly connected to the sponsoring device, connected to a LAN comprising the sponsoring device, and within a predefined maximum distance from the sponsoring device. A receiving device may also comprise an authenticator configured to detect the relationship property and allow or disallow displaying the selected digital content item.

Some example computer readable media having instructions implementing a local marketplace tool may include instructions configured to discover, aggregate, and display digital content item information identifying digital content items available from sponsoring devices for which a relationship property allows such discovery, aggregation, and displaying. For example, when the relationship property indicates that the receiving device is directly connected to the sponsoring device, connected to a LAN comprising the sponsoring device, and/or within a predefined maximum distance from the sponsoring device, the relationship property may allow such discovery, aggregation, and displaying.

Some example sponsoring devices may be configured to send temporary-use digital content to receiving devices. Sponsoring devices may comprise a processor, a memory, a communication device, and a digital content sponsoring service configured to send temporary-use digital content to receiving devices. The temporary-use digital content may comprise digital content that is usable at the computing device, for example, by being displayable and/or executable at the computing device, when a relationship property defining a relationship between the receiving device and the sponsoring device indicates that the receiving device is one or more of directly connected to the sponsoring device, connected to a LAN comprising the sponsoring device, and within a predefined maximum distance from the sponsoring device. Conversely, the temporary-use digital content is not displayable at the receiving device when the applicable relationship between the receiving device and the sponsoring device no longer exists. The sponsoring device may comprise a user device or a server, e.g., a server in a mass transit vehicle, a building server such as a library server, or a private business enterprise server.

In some embodiments, the temporary-use digital content may comprise a digital content item and an authenticator. In some embodiments, the temporary-use digital content may comprise a digital content item and an instruction for the computing device to load and execute an authenticator. In some embodiments, the temporary-use digital content may comprise a digital content item and an instruction for the receiving device to load and execute an auxiliary operating system, and to load and execute the digital content item in the auxiliary operating system, and to optionally also an instruction for the receiving device to load and execute an authenticator in the auxiliary operating system. In some embodiments, the temporary-use digital content may comprise a screen feed comprising the digital content, and the sponsoring device may be configured to open an auxiliary operating system, to load and execute the digital content item in the auxiliary operating system, and to send the screen feed associated with the auxiliary operating system to the receiving device.

Some example methods for providing temporary-use digital content to a receiving device may comprise publishing by a sponsoring device digital content item information identifying one or more temporary-use digital content items, receiving by the sponsoring device a request for a selected temporary-use digital content item, and sending by the sponsoring device the requested temporary-use digital content item to a receiving device. The temporary-use digital content item may comprise digital content that is displayable at the receiving device when a relationship property allows, as described above. Information identifying temporary-use parameters such as any required relationship properties applicable to the digital content may also be published.

Some example computer readable media may comprise instructions providing temporary-use digital content to a computing device, the instructions publishing by a sponsoring device digital content item information identifying one or more temporary-use digital content items, receiving by the sponsoring device a request for a selected temporary-use digital content item, and sending by the sponsoring device the requested temporary-use digital content item to a receiving device. The temporary-use digital content item may comprise digital content that is displayable at the computing device when a relationship property allows, as described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
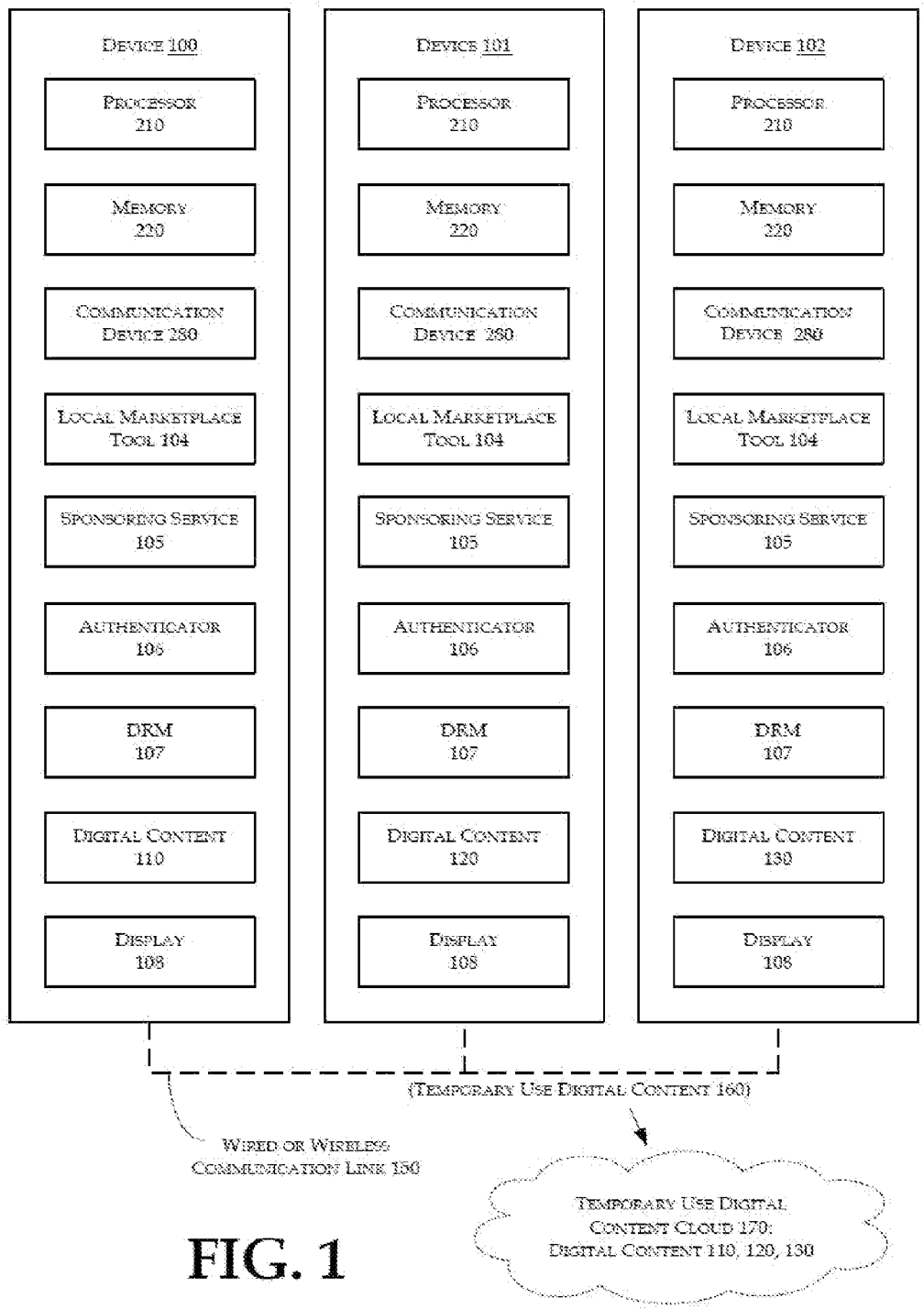
FIG. 1 is a diagram illustrating example computing devices connected via a wired or wireless communication link.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, and/or computer readable media related to contextual use and expiration of digital content. A receiving device may be configured to connect with a sponsoring device having the digital content. A relationship property defines a relationship context between the receiving device and the sponsoring device. The receiving device may be configured to receive the digital content from the sponsoring device and use the digital content so long as allowed, as determined with reference to the relationship property.

FIG. 1 is a diagram illustrating example computing devices 100, 101, 102 connected via a wired or wireless communication link 150, arranged in accordance with at least some embodiments of the present disclosure. Each of computing devices 100, 101, 102 may comprise, inter alia, a processor 210, a memory 220, a communication device 280, a local marketplace tool 104, a sponsoring service 105, an authenticator 106, a Digital Rights Management (DRM) module 107, and a display 108. Computing devices 100, 101, 102 may also comprise various digital content 110, 120, and 130. In some embodiments, digital content 110, 120, 130 on computing devices 100, 101, 102 may form a temporary-use digital content cloud 170. Digital content 110, 120, 130 in temporary-use digital content cloud 170 may be exchanged as temporary-use digital content 160, as described herein.

In some embodiments according to FIG. 1, a first computing device 100 of devices 100, 101, 102 may interact with one or more other computing devices 101 and/or 102, with first computing device 100 in a role of a "receiving device" configured to receive and use digital content, and any one or more of the other computing devices 101, 102 in roles of "sponsoring devices" configured to provide digital content to receiving device 100. Generally speaking, sponsoring devices 101, 102 may deliver digital content 120 to receiving device 100 in the form of temporary-use digital content 160 that may be used by receiving device 100 so long as a relationship between receiving device 100 and sponsoring devices 101, 102 allows. Temporary-use digital content 160 may expire and become inaccessible by receiving device 100 after the relationship between receiving device 100 and sponsoring devices 101, 102 no longer allows, as described herein.

There are various technical options for configuring the technologies disclosed herein. Prior to enumerating example technical options in detail, however, several real-world use case scenarios are presented below to illustrate example deployments of the technologies described herein.

First use case: travelers on a train. A train traveler Maya has Scrabble® installed on her mobile device. There is no internet service available on the train; however there is an available train-wide Wi-Fi service. Maya would like to play with other live players, in this case, her fellow travelers on the train. However, the fellow travelers may not have Scrabble® installed on their own mobile devices, and may not be able to acquire it without internet service. Using the technologies described herein, Maya may sponsor the temporary-use of the Scrabble® application on mobile devices operated by her fellow travelers. Once the train journey is over and the travelers go their separate ways, the temporary-use of the Scrabble® application may expire. The temporary users may be provided with an offer to acquire the game to convert their temporary license into a permanent license.

Second use case: in-flight entertainment system. An airline provides a server that stores a variety of digital content such as games, eBooks, and videos. The server publishes digital content information via an airplane Wi-Fi signal. Passengers may browse and select desired digital content using their own mobile devices, and receive and display selected digital content, in a temporary form, at their mobile devices. The temporary-use digital content expires when the passengers leave the airplane. The temporary users (passengers) may be provided with an offer to acquire the digital content prior to leaving the airplane or thereafter.

Third use case: tour bus. A group of tourists are on a bus in a remote area. The tourists do not have access to their normal digital content stores, such as the iTunes® store or the Android® Marketplace store, and so new applications as well as other digital content such as songs and videos are not accessible. However, collectively the group of tourists has a large and diverse number of digital content items on their various mobile devices. The devices can connect through a local digital content marketplace tool to discover digital content stored on other tourists' devices, and may receive and use such digital content from one another on a temporary basis. Again, the temporary users may also be provided with an offer to acquire the digital content.

Referring again to FIG. 1, each of computing devices 100, 101, 102 may comprise device hardware such as processor 210, memory 220, communication device 280, and display 108. These and other aspects of device hardware are discussed in further detail with reference to FIG. 2.

Any of computing devices 100, 101, 102 may be configured to receive and use digital content from a sponsoring device. In some embodiments, devices 100, 101, 102 may be configured to both receive digital content and sponsor digital content by including for example the device elements illustrated in FIG. 1. In some embodiments, any of devices 100, 101, 102 may be configured to receive and use, e.g., display digital content from a sponsoring device, but not to sponsor digital content, for example by including the device elements illustrated in FIG. 1 except sponsoring service 105. This disclosure uses "displaying" digital content as an example of using digital content, however, it will be appreciated that uses that do not include "displaying" are also within the scope of this disclosure. For example, executing software code included in digital content may or may not include displaying the digital content.

Any of devices 100, 101, 102 may be configured to sponsor digital content. In some embodiments, any of devices 100, 101, 102 may be configured to sponsor digital content, but not to receive and display digital content, for example by including sponsoring service 105 but optionally not including local marketplace tool 104, authenticator 106, and/or DRM module 107. In the case of a server supporting a sponsoring service, a sponsoring device may optionally also not include display 108.

It will be appreciated that digital content may take many forms, and any form of digital content may be used with embodiments of this disclosure. Digital content may for example comprise an application, video file, audio file, image file, file stream, and/or text file, and combinations thereof. Digital content may take the form of an entire digital content "item" such as an entire file, or may comprise some portion thereof such as a stream that includes portions of one or more files, or a segment of a larger digital content item. In some embodiments, digital content may comprise a multi-user application that enables interaction between a user of receiving device 100 and a user of sponsoring device 102. Embodiments may include features facilitating the interaction of the users via the multi-user application, or may leave this aspect to the native operations of operating systems of devices 100, 101, 102, and/or the multi-user application itself.

Receiving device 100 may include authenticator 106 loadable into memory 220 and executable by processor 210. Authenticator 106 may be configured to detect a relationship property defining a relationship between receiving device 100 and sponsoring device 101, and to allow and disallow displaying digital content 120 by receiving device 100, based on a relationship property status. Example relationships definable by relationship properties include: whether receiving device 100 is directly connected to sponsoring device 101, whether receiving device 100 is connected to a LAN comprising sponsoring device 101, or whether receiving device 100 is within a predefined maximum distance from sponsoring device 101. These are example relationships only and it is contemplated that persons of skill in the art will be able to define additional relationships that are workable within the teachings of this disclosure.

In some embodiments, authenticator 106 at receiving device 100 may be configured to detect whether receiving device 100 is directly connected to sponsoring device 101. As used herein, the term "directly connected" refers to a connection between devices that does not involve any intermediate devices. For example, devices 100, 101 may communicate directly by link 150 so long as link 150 does not relay signals from devices 100, 101 through an intermediate device such as a wired or wireless router, prior to signals from receiving device 100 arriving at sponsoring device 101 or vice versa. As the term "intermediate device" is used herein, a device may be characterized as an intermediate device if it is not controlled by receiving device 100 or sponsoring device 101. Based on the preceding statement, any device included within a housing of a receiving device or a sponsoring device would not be considered an intermediate device. Similarly, devices such as wireless cards and the like which may be connected to a receiving device or a sponsoring device via universal Serial Bus (USB) and are controlled by the receiving device or the sponsoring device are not considered to comprise intermediate devices.

Detecting a direct connection may be performed in a variety of technically feasible approaches. In some embodiments, communication link 150 may be configured to allow only direct communications between receiving device 100 and sponsoring devices 101, 102, and authenticator 106 may be configured to detect the direct connection by detecting that link 150 is active and that sponsoring devices 101, 102 associated with digital content received at receiving device 100 remain available via link 150.

In some embodiments, authenticator 106 at receiving device 100 may be configured to detect whether receiving device 100 is connected to a LAN comprising sponsoring device 101. A LAN is defined herein as any network that connects computers and devices in a limited geographical area such as home, school, library, computer laboratory, office building, vehicle such as an automobile, airplane, bus, or train, closely positioned group of buildings, stadium or other area that is for example 5 square kilometers or less in size. A LAN as defined herein may comprise a so-called home network, Wi-Fi network, Bluetooth network, ad-hoc network, Storage Area Network (SAN), campus network, Near Field Communication (NFC) network, Body Area Network (BAN), Personal Area Network (PAN), and any other network that is limited in geographical area, for example 5 square kilometers or less in size. Devices 100, 101, 102 may establish a LAN over communication link 150. Authenticator 106 at receiving device 100 may be configured to detect the existence of the LAN, and to detect that sponsoring devices 101, 102 associated with content received at receiving device 100 remain available via the LAN. Authenticator 106 may be configured to allow loading and executing the digital content 120 in receiving device 100 when a relationship property indicates that receiving device 100 remains connected to a same LAN comprising sponsoring device 101 as a LAN used when first receiving digital content 120 from sponsoring device 101.

In some embodiments, authenticator 106 at receiving device 100 may be configured to detect whether receiving device 100 is within a predefined maximum distance from sponsoring device 101. For example, receiving device 100 may be Global Positioning System-enabled (GPS-enabled) and sponsoring device 101 may share GPS information with receiving device 100, so that authenticator 106 at receiving device 100 can establish its own location as well as a location of sponsoring device 101. Authenticator 106 at receiving device 100 may be configured to detect GPS locations of receiving device 100 and sponsoring device 101, and to compare GPS locations to determine whether receiving device 100 is within a predefined maximum distance from sponsoring device 101. Technologies other than GPS may be used in some embodiments determine location—it will be appreciated that any technologies whether now in existence or as may be developed in the future may be appropriate for some embodiments of this disclosure.

Authenticator 106 at receiving device 100 may be configured to allow displaying digital content 120 by receiving device 100 when the relationship property allows, for example, when receiving device 100 is one or more of: directly connected to the sponsoring device 101; connected to a LAN comprising the sponsoring device 101; and/or within a predefined maximum distance from the sponsoring device 101. Authenticator 106 at receiving device 100 may disallow displaying digital content 120 by receiving device 100 when a relationship property indicates that receiving device 100 is one or more of: not directly connected to sponsoring device 101; not connected to a LAN comprising sponsoring device 101; and not within a predefined maximum distance from sponsoring device 101.

In some embodiments, authenticator 106 at receiving device 100 may be configured to allow and disallow displaying digital content 120 in response to one or more parameters other than a detected relationship property. For example, in some embodiments, the authenticator may be configured to apply one or more of a time limit and a usage count limit, and to disallow displaying the digital content after the time limit or usage count limit has elapsed. In an example scenario, a meeting may be scheduled for a particular time and duration, and at a particular location. The meeting participants (and their receiving devices) may or may not be connected to a same LAN. The context of the meeting may be defined by the location (e.g., GPS co-ordinates), the time, and the duration of the meeting. Digital content may be sponsored by one or more meeting participants for use by the others. The digital content may be accessible only during the meeting and in the meeting location. After the meeting, use of the digital content by the receiving devices may be disallowed, optionally even if a receiving device remains in the meeting location, due to the lapse of the time specified for the meeting. Use of digital content may also be allowed/disallowed according to a usage count, either in combination with restrictions according to time/location/relationship properties, or independently.

In addition to, or in lieu of, allowing and disallowing display of digital content 120 from sponsoring device 101, other forms of digital content consumption may also be allowed and disallowed. For example, authenticator 106 may be configured to allow and disallow audio playback using the techniques described herein.

Allowing and disallowing consumption of digital content 120 by receiving device 100 may be achieved using a variety of technical approaches. For example, in some embodiments, authenticator 106 may be configured to instruct DRM module 107 at receiving device 100 to allow or disallow displaying digital content 120. DRM module 107 may be responsible for ascertaining whether access to particular digital content is permissible, and decrypting digital content using decryption keys when permissible. DRM module 107 may be configured to revoke a decryption key in response to an instruction from authenticator 106. In some embodiments, authenticator 106 may be configured to allow displaying digital content 120 by validating a decryption key using a relationship property, and to disallow displaying digital content 120 by revoking the decryption key.

In some embodiments, a relationship property that indicates that displaying of digital content 120 is allowed may be specified by sponsoring device 101 and/or within temporary-use digital content 160 received at receiving device 100. Receiving device 100 may be configured to allow and disallow displaying digital content 120 by detecting a relationship property specified by the sponsoring device 101 and/or within temporary-use digital content 160.

There are a number of example approaches to enforcing temporary-use of digital content by receiving device 100. First, in some embodiments, receiving device 100 may be configured to natively comprise authenticator 106, e.g., as an application or as a part of an operating system. Sponsoring device 101 may be configured to provide digital content 120 with appropriate encryption and instructions for authenticator 106 at receiving device 100, so that digital content 120 will "expire" or be disallowed by native authenticator 106 once a relationship property is no longer true. In this case, temporary-use digital content 160 may comprise digital content 120 along with instructions for native authenticator 106 at receiving device 100.

Second, in some embodiments, receiving device 100 may receive digital content 120 and authenticator 106 from sponsoring device 101. Receiving device 100 may be configured to load and execute authenticator 106 in response to an instruction received from sponsoring device 101 along with received digital content 120 and received authenticator 106. Authenticator 106 thereafter allows and disallows displaying of digital content 120. In this case, temporary-use digital content 160 comprises digital content 120 along with authenticator 106, and any instructions for loading authenticator 106 as a prerequisite to displaying digital content 120.

Third, in some embodiments, receiving device 100 may be configured to load and execute an auxiliary operating system, e.g., a Virtual Machine (VM), and to load and execute digital content 120 in the auxiliary operating system, in response to an instruction received from sponsoring device 101 along with digital content 120. This third approach may be applied in combination with the first or second approaches described above. This third approach has the advantage of allowing mobile devices having diverse platforms, e.g., Android®, iOS®, and Windows Mobile® platforms, to nonetheless share digital content 120 by employing virtual machines equipped to operate with digital content 120.

Fourth, in some embodiments, receiving device 100 may be configured to receive, from sponsoring device 101, a screen feed comprising digital content 120. In some embodiments, the screen feed may be produced by an auxiliary operating system instance loaded at sponsoring device 101. Receiving device 100 may be configured to send digital content interaction instructions to sponsoring device 101 and sponsoring device 101 may be configured to process receiving device 100 interactions with digital content 120 and update the screen feed accordingly. The screen feed will generally be lost when a communication link between devices becomes inoperable, and authenticator 106 at receiving device 100 may configured to operate in such embodiments as a backup that guarantees expiration of received content, and/or to otherwise limit the use of digital content 120 included in the screen feed at receiving device 100.

In some embodiments, devices 100, 101, 102 may include a local marketplace tool 104. In general, local marketplace tool 104 may be configured to discover, aggregate, and display, at receiving device 100, digital content item information identifying one or more digital content items available from one or more sponsoring devices 101, 102 for which a relationship property defining a relationship between receiving device 100 and one or more sponsoring devices 101, 102 allows displaying the digital content items by receiving device 100, as described above. For example, local marketplace tool 104 at receiving device 100 may discover, aggregate, and display digital content item information identifying digital content in temporary-use digital content cloud 170, in particular digital content 120 and 130, because digital content 110 is already at receiving device 100 and therefore the user of receiving device 100 does not need to be made aware of availability of digital content 110. In some embodiments, local marketplace tool 104 may provide a limited substitute digital content marketplace at receiving device 100 that may lack a broad network connection providing access to large digital content marketplaces such as iTunes® or Android® Market. Digital content available from local marketplace tool 104 may include digital content available from devices to with which receiving device 100 can connect in a particular context, and use of digital content available from local marketplace tool 104 may be limited to the particular context, as defined by a relationship property.

Local marketplace tool 104 may be included as a part of an operating system included in receiving device 100, or may be included in receiving device 100 as a separate, freestanding application. Local marketplace tool 104 may be configured to retrieve, via communication device 280, a selected digital content item, e.g., digital content 120. Local marketplace tool 104 may be configured to load an authenticator and/or other elements allowing receiving device 100 to temporarily access retrieved digital content 120. For example, local marketplace tool 104 may be configured to load and execute authenticator 106 as a precondition to displaying digital content 120. Authenticator 106 may in some embodiments be received from sponsoring device 101 along with digital content item 120, as described above. Local marketplace tool 104 may be configured to load and execute an auxiliary operating system, and to load and execute a digital content item with the auxiliary operating system, as discussed above. Local marketplace tool 104 may additionally or alternatively be configured to connect receiving device 100 with a screen feed from sponsoring device 101, the screen feed comprising digital content 120.

In embodiments where a receiving device 100 comprising local marketplace tool 104, authenticator 106 may be configured to detect a relationship property defining a relationship with sponsoring device 101 in response to user selection of a digital content item from digital content item information displayed by local marketplace tool 104 at receiving device 100. Authenticator 106 may be configured to allow or disallow displaying the selected digital content item according to whether the relationship property allows or disallows displaying the selected digital content item, as described above.

With or without local marketplace tool 104 in receiving device 100, authenticator 106 may be configured to detect a relationship property during display of a digital content item, and authenticator 106 may be configured to allow or disallow further displaying the selected digital content item according to whether the relationship property allows or disallows displaying the selected digital content item. For example, authenticator 106 may be configured to make periodic detection attempts to validate the relationship property, so long as temporary-use digital content is displayed.

In some embodiments, local marketplace tool 104 may be configured to receive and display price information with digital content item information. Local marketplace tool 104 may be configured to provide a UI configured to receive payment information. Local marketplace tool 104 may be configured to queue and/or execute a payment in consideration for temporary-use of exchanged digital content. For example, temporary-use of digital content may comprise "renting" digital content. In such embodiments, owners of digital content may associate temporary-use price metadata with digital content, and local marketplace tool 104 may be configured to extract and display the temporary-use price metadata.

In some embodiments, local marketplace tool 104 may be configured to provide an opportunity to acquire digital content from a source other than a sponsoring device. For example, local marketplace tool 104 may be configured to provide a UI prompting purchase or other acquisition of digital content, after receiving device 100 is no longer permitted to use the digital content under its temporary-use license, i.e., when displaying the digital content by receiving device 100 is disallowed. In some embodiments, the UI prompting purchase may be provided when digital content, such as a video, was not watched through to the end, or for example if a game was not played through the end thereof. In some embodiments, a UI prompting purchase may be provided when digital content, such as a game or other application, was used under a temporary license at least some predefined threshold amount, as defined by time or number of interactions. In some embodiments, payment and/or acquisition prompt features described above in connection with local marketplace tool 104 may be provided in another element such as a payment manager and/or authenticator 106.

Turning now to a discussion of aspects of sponsoring devices, a computing device such as, for example, device 101, may be configured as a sponsoring device 101 by including, inter alia, digital content sponsoring service 105. Digital content sponsoring service 105 may be configured to publish digital content item information identifying one or more temporary-use digital content items, such as digital content item 120. Sponsoring service 105 may be configured to receive a request for a selected temporary-use digital content item. Sponsoring service 105 may be configured to send, in response to the received request, temporary-use digital content 160 to receiving device 100, wherein temporary-use digital content 160 comprises selected digital content 120 that is displayable at receiving device 100 when a relationship property defining a relationship between receiving device 100 and sponsoring device 101 allows. For example, as described above, the relationship property may allow displaying digital content 120 when it indicates that receiving device 100 is one or more of: directly connected to sponsoring device 101, connected to a LAN comprising sponsoring device 101, and within a predefined maximum distance from sponsoring device 101. A relationship property may disallow displaying digital content 120, and digital content 120 may be not displayable at receiving device 100, when the relationship property defining a relationship between receiving device 100 and sponsoring device 101 indicates that receiving device 100 is one or more of: not directly connected to sponsoring device 101, not connected to a LAN comprising sponsoring device 101, or not within a predefined maximum distance from sponsoring device 101.

In some embodiments, sponsoring service 105 may be configured to publish price information with digital content item information. Prior to sending digital content to a receiving device, sponsoring service 105 may be configured to provide a UI configured to receive payment information. Sponsoring service 105 may be configured to queue and/or execute a payment in consideration for temporary-use of digital content. For example, temporary-use of digital content may comprise "renting" digital content. In such embodiments, owners of digital content may associate temporary-use price metadata with digital content, and sponsoring service 105 may be configured to extract and display the temporary-use price metadata, and to process digital content rental payments.

In some embodiments, sponsoring device 101 may comprise a mobile device that is configured for personal use, such as a small form-factor device that can be carried in a pocket, briefcase or purse. In other embodiments, sponsoring device 101 may comprise a larger form-factor server that is not configured to be carried about. For example sponsoring device 101 may comprise a server in a mass transit vehicle, a building server such as a library server, or a private business enterprise server. A server may be dedicated to providing temporary-use digital content. In a mass transit setting, temporary-use digital content may be provided for entertainment of passengers, with an option to purchase content upon arrival at a destination. In a library server, temporary-use digital content may be usefully limited to patrons that are physically within a library. Similarly, temporary-use digital content may be usefully limited to occupants of any common location such as a building or park. In a private business enterprise server, certain proprietary or confidential temporary-use digital content may be advantageously restricted so that employees may access digital content on business premises, and may not access digital content from locations outside business premises.

Sponsoring device 101 may be configured to arrange temporary-use digital content 160 according any configuration discussed herein. For example, temporary-use digital content 160 may comprise digital content item 120 and authenticator 106, so that receiving device 100 loads authenticator 106 along with digital content item 120. Temporary-use digital content 160 may comprise digital content item 120 and an instruction for receiving device 100 to load and execute an auxiliary operating system, and to load and execute the digital content item 120 in the auxiliary operating system. Temporary-use digital content 160 may comprise a screen feed comprising digital content 120, and sponsoring device 101 may be configured to open an auxiliary operating system, to load and execute digital content item 120 in the auxiliary operating system, and to send the screen feed associated with the auxiliary operating system to receiving device 100.

Figure 2:
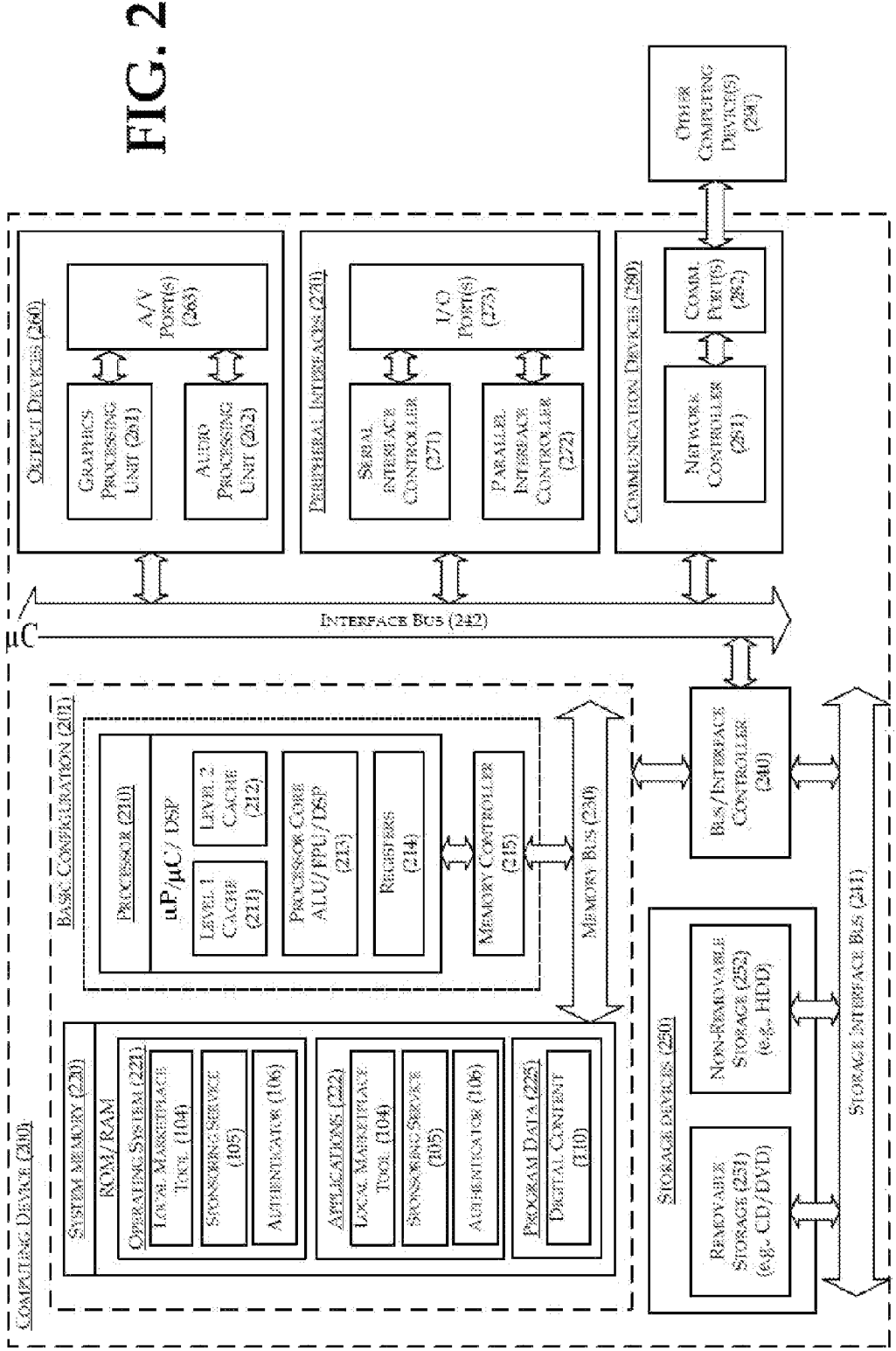
FIG. 2 is a block diagram illustrating a computing device as one example of a receiving device configured to receive and display digital content from a sponsoring device, and as one example of a sponsoring device.

FIG. 2 is a block diagram of a computing device 200 as one example of a receiving device configured to receive and display digital content 120 from a sponsoring device, and/or configured as a sponsoring device. Computing device 200 is arranged in accordance with at least some embodiments of the present disclosure. In a very basic configuration 201, computing device 200 may include one or more processors 210 and system memory 220. A memory bus 230 may be used for communicating between processor 210 and system memory 220.

Depending on the desired configuration, processor 210 may be of any type including but not limited to a microprocessor (µP), a microcontroller (µC), a digital signal processor (DSP), or any combination thereof. Processor 210 may include one or more levels of caching, such as a level one cache 211 and a level two cache 212, a processor core 213, and registers 214. The processor core 213 may include an arithmetic logic unit (ALU), a floating point unit (FPU), a digital signal processing core (DSP Core), or any combination thereof. A memory controller 215 may also be used with processor 210, or in some implementations memory controller 215 may be an internal part of processor 210.

Depending on the desired configuration, system memory 220 may be of any type including but not limited to volatile memory (such as RAM), non-volatile memory (such as ROM, flash memory, etc.), or any combination thereof. System memory 220 typically includes an operating system 221, one or more applications 222, and program data 225. Operating system 221 and/or applications 222 may include, for example, local marketplace tool 104, sponsoring service 105, and/or authenticator 106. DRM modules (not shown in FIG. 2) are typically though not necessarily included in operating system 221.

Program data 225 may include digital content 110 that may be provided to other devices such as 101, 102, by sponsoring service 105 when device 200 functions as a sponsoring device. It will be appreciated with the benefit of this disclosure that the features of local marketplace tool 104, sponsoring service 105, and/or authenticator 106 disclosed herein may be rearranged and combined in a large variety of different ways. This disclosure contemplates the possibility of moving any of the disclosed features into any of described software elements, as may be necessary or convenient for particular embodiments.

Computing device 200 may have additional features or functionality, and additional interfaces to facilitate communications between the basic configuration 201 and any required devices and interfaces. For example, computing device 200 may include a GPS unit for determining location, as well as software configured to determine locations of other devices. A bus/interface controller 240 may be used to facilitate communications between the basic configuration 201 and one or more data storage devices 250 via a storage interface bus 241. The data storage devices 250 may be removable storage devices 251, non-removable storage devices 252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

System memory 220, removable storage 251, and non-removable storage 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 200. Any such computer storage media may be part of device 200.

Computing device 200 may also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which may be configured to communicate to various external devices such as a display, e.g., display 108 in FIG. 1, or speakers via one or more A/V ports 263. Example peripheral interfaces 270 may include a serial interface controller 271 or a parallel interface controller 272, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 273. Other conventional I/O devices may be connected as well such as a mouse, keyboard, and so forth. An example communications device 280 includes a network controller 281, which may be arranged to facilitate communications with one or more other computing devices 290 over a network communication via one or more communication ports 282.

Computing device 200 may be implemented as any device type, including for example, a smart phone, a laptop or desktop computer, a server computer, a tabletop or other display, a television, a stereo system, an on-board vehicle computer, a small-form factor portable (or mobile) electronic device such as a cell phone, personal data assistant (PDA), personal media player device, wireless web-watch device, and/or personal headset device, an application-specific device, and/or or a hybrid device that may include any of the above functions.

Figure 3:
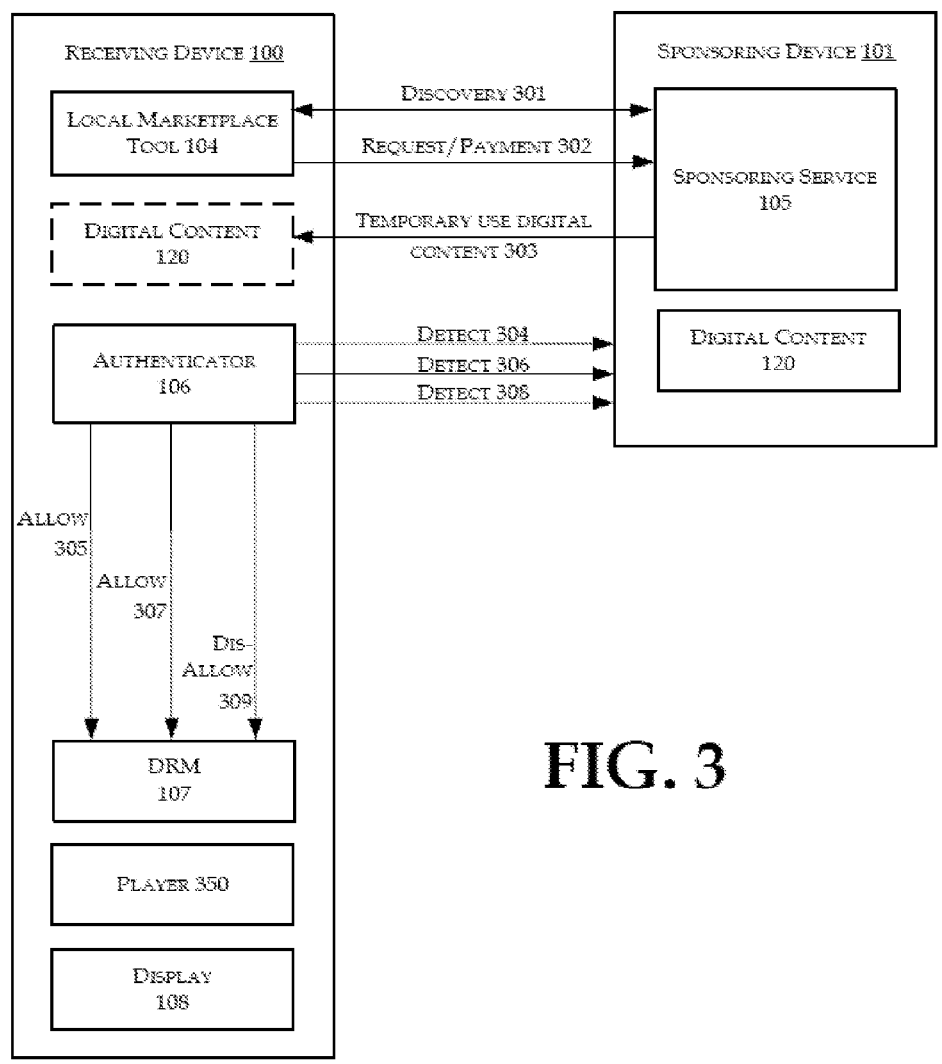
FIG. 3 is a schematic diagram illustrating example interactions between a receiving device configured to receive and display digital content, and a sponsoring device.

FIG. 3 is a schematic diagram illustrating example interactions between receiving device 100 configured to receive and display digital content 120, and sponsoring device 101, arranged in accordance with at least some embodiments of the present disclosure. Receiving device 100 includes local marketplace tool 104, digital content 120 received from sponsoring device 101, authenticator 106, DRM module 107, a player 350 and display 108. Sponsoring device 101 includes sponsoring service 105 and digital content 120. In some embodiments, devices 100, 101 may also include any of the other features disclosed herein. FIG. 3 provides a general view of an example interaction between receiving device 100 and sponsoring device 101. Further details and elements involved in interactions between receiving device 100 and sponsoring device 101 are described in connection with FIG. 4 and FIG. 5, respectively.

In accordance with FIG. 3, example methods may comprise a discovery operation 301 including discovering, by receiving device 100, digital content available from one or more sponsoring devices 101, wherein the available sponsoring devices are those for which a relationship property indicates that receiving device 100 is one or more of: directly connected to sponsoring device 101, connected to a LAN comprising sponsoring device 101, and within a predefined maximum distance from sponsoring device 101. In some embodiments, discovery 301 may include one or more of publication of digital content information by sponsoring device 101, and discovery, aggregation and display of published digital content by local marketplace tool 104. In some embodiments, specialized tools or software need not be involved in discovery 301. For example, a message board may allow users to post and discover digital content available from sponsoring devices.

A user of receiving device 100 may select discovered digital content, and local marketplace tool 104 may be configured to initiate a request/payment operation 302 in response to the user selection. When payment is not required, local marketplace tool 104 may be configured to request the selected digital content from a sponsoring device having the selected digital content. When payment is required, local marketplace tool 104 may present a payment UI to a user at receiving device 100, receive payment information via the payment UI, and send received payment information to sponsoring device 101.

In operation 303, sponsoring service 105 may be configured to send requested digital content 120 to receiving device 100. Sponsoring service 105 may be configured to send digital content 120 in the form of temporary-use digital content, for example by including such additional executable code with digital content 120 as necessary to ensure that digital content 120 is disabled when a relationship property is no longer valid, or by sending digital content 120 in such a form that it automatically becomes unavailable or inaccessible when the relationship property is no longer valid. Embodiments of temporary-use digital content may for example include authenticator 106 along with digital content 120. Embodiments of temporary-use digital content may provide prerequisite instructions along with digital content 120, the prerequisite instructions for example requiring operation of authenticator 106 at receiving device 100 in order to access digital content 120.

In operations 304-309, authenticator 106 may be configured to detect a relationship property defining a relationship of receiving device 100 with sponsoring device 101 and to allow and/or disallow displaying digital content item 120 as described above. For example, authenticator 106 may be configured to detect in operation 304 whether the relationship property continues to allow displaying digital content 120. In an example in which the relationship property allows continued displaying of digital content 120, authenticator 106 may be configured to allow DRM module 107 to display digital content 120 in operation 305, e.g., by providing DRM module 107 with an updated decryption key indicating that the relationship property remains valid. Alternatively, in some embodiments authenticator 106 may be configured to allow DRM module 107 to display digital content 120 in operation 305 by not taking action to disallow the displaying of digital content 120, or by sending a status update to DRM module 107. Similarly, authenticator 106 may be configured to detect in operation 306 whether the relationship property continues to allow displaying digital content 120. If the relationship property continues to allow, authenticator 106 may be configured to allow DRM module 107 to continue to display digital content 120 in operation 307.

Similarly, authenticator 106 may be configured to detect in operation 306 whether the relationship property continues to allow displaying digital content 120. However, in this example detection in operation 306 results in a determination that the relationship property disallows displaying digital content 120 in operation 308. Therefore, authenticator 106 may be configured to disallow displaying digital content 120 in operation 309, for example by revoking a decryption key used by DRM module 107, or otherwise notifying DRM module 107 that digital content 120 has been disallowed. DRM module 107 may be configured to enforce termination of displaying digital content 120 by player 350 and/or display 108, and to either delete or prevent subsequent unlicensed access to digital content 120 by receiving device 100.

Figure 4:
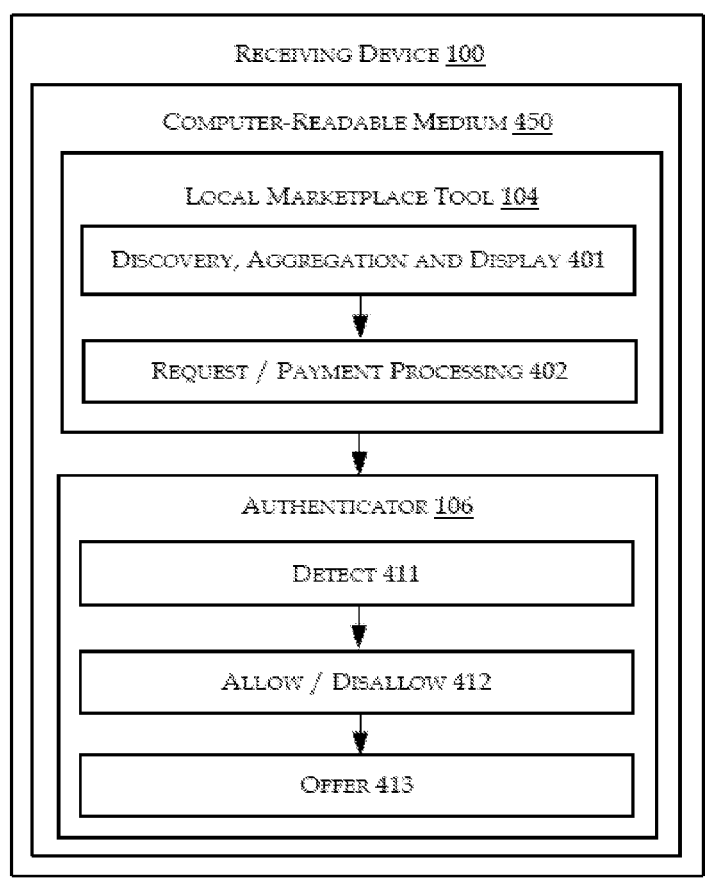
FIG. 4 is a block diagram illustrating an example receiving device, computer readable medium, and corresponding methods and modules configured to receive and authenticate digital content.

FIG. 4 is a block diagram illustrating an example receiving device 100, computer readable medium, and corresponding methods and modules configured to receive and allow and/or disallow displaying digital content, arranged in accordance with at least some embodiments of the present disclosure. Example receiving device 100 may include one or more operations/modules including blocks 104, 401, 402, 106, 411, 412, and 413. The illustrated blocks represent operations as may be performed in a method, functional modules in receiving device 100, and/or instructions as may be recorded on a computer readable medium 450. The illustrated blocks may be arranged to provide functional operations of local marketplace tool 104, comprising "Discovery, Aggregation, and Display" at block 401, and "Request/Payment Processing" at block 402. The illustrated blocks may be arranged to provide functional operations of an authenticator 106, comprising "Detect" at block 411, "Allow/Disallow" at block 412, and "Offer" at block 413.

In FIG. 4, certain blocks are illustrated as being performed sequentially. The blocks of local marketplace tool 104 are illustrated first and the blocks of authenticator 106 are illustrated last. It will be appreciated that the blocks may be re-ordered as convenient to suit particular embodiments, and that these blocks or portions thereof may be performed concurrently in some embodiments. It will also be appreciated that in some examples various blocks may be eliminated, divided into additional blocks, and/or combined with other blocks.

In "Local Marketplace Tool" block 104, local marketplace tool 104 may be configured to operate in response to a user command. Block 104 may initiate "Discovery, Aggregation, and Display" block 401. Block 401 may be configured to make sponsoring service calls to any available sponsoring devices. For example, a discovery message may be broadcast via a Wi-Fi signal, wherein the discovery message is configured for reception by sponsoring services. Block 401 may be configured to receive digital content information from available, responding sponsoring devices, to aggregate the digital content information into a local marketplace tool UI at receiving device 100, and to display the local marketplace tool UI with the aggregated digital content information. Block 401 may be followed by block 402.

In "Request/Payment Processing" block 402, local marketplace tool 104 may be configured to receive a user selection of digital content from the local marketplace tool UI displayed by block 401. Block 402 may be configured to initiate a request and/or payment in response to the user selection. When payment is not required, block 402 may be configured to request the selected digital content from the sponsoring device having the selected digital content, by a call to sponsoring service 105 of an appropriate sponsoring device, wherein the call includes digital content identification information. When payment is required, block 402 may be configured to present a payment UI at receiving device 100, and to receive payment information via the payment UI, and to send the payment information to the sponsoring device having the digital content. Alternatively, block 402 may secure an authorization to process a payment at a later time, e.g., when the receiving device 100 is again connected to a Wide Area Network (WAN) or other network generally allowing internet access. Block 402 may be configured to receive the requested digital content, and to load and execute authenticator 106 to allow or disallow displaying digital content. Block 402 may be followed by block 106.

In "Authenticator" block 106, authenticator 106 may be loaded and executed in receiving device 100, as a prerequisite to allowing display of the digital content received from sponsoring device 101. Authenticator 106 may be configured launch a "Detect" block 411. "Detect" block 411 may be configured to detect a relationship property defining a relationship between receiving device 100 and sponsoring device 101. As discussed herein, example relationships definable by relationship properties include: whether receiving device 100 is directly connected to sponsoring device 101, whether receiving device 100 is connected to a LAN comprising sponsoring device 101, and whether receiving device 100 is within a predefined maximum distance from sponsoring device 101. In some embodiments, the relationship property detected by block 411 may be specified by instructions or information received with digital content. In some embodiments, the relationship property may encompass any of several defined relationships, and displaying received digital content may be allowed so long as a relationship existing at a time of receiving digital content remains intact. Relationship property detection may comprise performing a network discovery operation. In some embodiments, block 411 may be configured to detect a relationship by sending a message to sponsoring device 101, awaiting a response, and analyzing response properties. For example, Internet Protocol (IP) packet properties may be analyzed to determine aspects of a relationship between receiving device 100 and sponsoring device 101. Block 411 may perform detection operations at any frequency, for example, detection operations may be performed at any frequency from once per second to once per several minutes. Block 411 may be followed by block 412.

In "Allow/Disallow" block 412, authenticator 106 may be configured to allow and/or disallow displaying digital content in response to a detected relationship property. For example, when authenticator 106 detects in block 411 that receiving device 100 remains directly connected to sponsoring device 101, connected to a LAN comprising sponsoring device 101, and/or within a predefined maximum distance from sponsoring device 101, or otherwise remains within a permitted, defined relationship with sponsoring device 101, block 402 may be configured to allow displaying digital content. When authenticator 106 detects in block 411 that a permitted, defined relationship between receiving device 100 and sponsoring device 101 no longer exists, block 402 may be configured to disallow displaying digital content. In some embodiments, block 402 may be configured to operate in conjunction with DRM module 107. In some embodiments, block 402 may be configured to operate in conjunction with player 350, and received digital content may be deleted, scrambled, or otherwise disabled after display is disallowed. Block 412 may be followed by block 413.

In "Offer" block 413, authenticator 106 may be configured to provide an opportunity for a permanent license to the received digital content. In some embodiments, authenticator 106 may be configured to pass control back to local marketplace tool 104 for performance of block 413. Block 413 may be configured to provide a UI prompting purchase other acquisition of digital content, after displaying the digital content is disallowed. Like block 402, block 413 may be configured to present a payment UI at receiving device 100, and to receive payment information via the payment UI, and to send received payment information to a sponsoring device sponsoring exchanged digital content. Alternatively, block 402 may be configured to secure an authorization to process a payment at a later time, e.g., when receiving device 100 is again connected to a Wide Area Network (WAN) or other network generally allowing internet access. In some embodiments, block 413 may be configured to provide a UI prompting digital content purchase when digital content, such as a video, was not watched through to the end thereof. In some embodiments, block 413 may be configured to provide a UI prompting digital content purchase when digital content, such as a game or other application, was used under temporary license at least some predefined threshold amount, as defined by digital content display time or number of interactions with digital content.

Figure 5:
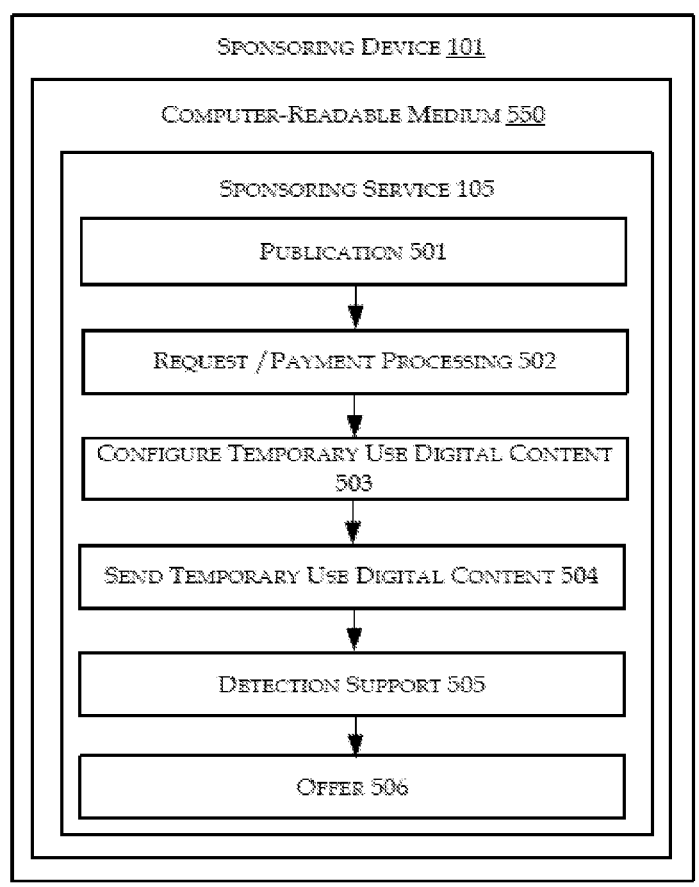
FIG. 5 is a block diagram illustrating an example sponsoring device, computer readable medium, and corresponding methods and modules configured to provide a sponsoring service.

FIG. 5 is a block diagram illustrating an example sponsoring device 101, computer readable medium, and corresponding methods and modules configured to provide a sponsoring service, arranged in accordance with at least some embodiments of the present disclosure. Example sponsoring device 101 may include one or more operations/modules including blocks 105 and 501-506. The illustrated blocks represent operations as may be performed in a method, functional modules in a sponsoring device 101, and/or instructions as may be recorded on a computer readable medium 550. The illustrated blocks may be arranged to provide functional operations of sponsoring service 105, comprising "Publication" at block 501, "Request/Payment Processing" at block 502, "Configure Temporary-use Digital Content" at block 503, "Send Temporary-use Digital Content" at block 504, "Detection Support" at block 505, and "Offer" at block 506.

In FIG. 5, the blocks 501-506 are illustrated as being performed sequentially, with block 501 first and block 506 last. It will be appreciated that the blocks may be re-ordered as convenient to suit particular embodiments, and that these blocks or portions thereof may be performed concurrently in some embodiments. It will also be appreciated that in some examples various blocks may be eliminated, divided into additional blocks, and/or combined with other blocks.

In "Sponsoring Service" block 105, sponsoring service 105 may be configured to manage operations of blocks 501-506. In some embodiments, sponsoring service 105 may be launched in response to a user command. In some embodiments, sponsoring service 105 may be launched automatically along with an operating system (OS). For example, when sponsoring device 101 is configured as a server, sponsoring service 105 may be launched automatically with a server OS. In some embodiments, sponsoring service 105 may be launched automatically in response to certain conditions, e.g., in response to the loss of a WAN connection by sponsoring device 101 and/or in response to detection of signals from local marketplace tool 104 at receiving device 100. Once sponsoring service 105 is launched, block 105 may begin with loading and executing block 501.

In "Publication" block 501, sponsoring service 105 may be configured to publish digital content item information identifying one or more temporary-use digital content items. In some embodiments, a user of sponsoring device 101 may select those digital content items he wishes to publish, and block 501 may be configured to receive user publication selections. In some embodiments, digital content may include temporary-use permissions, and block 501 may be configured to publish those digital content items having a permission flag. The published digital content information may identify digital content by title, author, file name, description, an image such as an icon, or other identifying information. In some embodiments, published digital content information may include additional information such as price metadata, OS requirements for devices receiving and displaying the content, relationship property requirements, and/or other temporary use parameters defining allowable uses of digital content. In some embodiments, block 501 may be configured to publish digital content information by making digital content information available to any device upon request, e.g., via an Application Programming Interface (API) provided by sponsoring service 105. In some embodiments, block 501 may be configured to publish digital content information by posting digital content information to a message board or other location accessible from other devices. In some embodiments, block 501 may be configured to publish information by broadcasting, either continuously or intermittently, a wireless signal including digital content item information. Block 501 may be followed by block 502.

In "Request/Payment Processing" block 502, sponsoring service 105 may be configured to receive a request for a selected temporary-use digital content item, selected from the published digital content item information, and to process any required payment. In some embodiments, receiving a request may comprise receiving a call from receiving device 100 to an API provided by sponsoring service 105. In some embodiments, receiving a request may comprise receiving a command via a UI provided by sponsoring service 105. For example a user of sponsoring device 101 may request sponsoring service 105 to provide digital content to receiving device 100. In either case, a received call or request may include digital content identification information and receiving device information. Processing a payment may comprise requesting and/or receiving payment information in consideration for temporary-use digital content, and completing payment or storing payment information for later payment completion. Block 502 may be followed by block 503.

In "Configure Temporary-use Digital Content" block 503, sponsoring service 105 may be arranged to configure a selected temporary-use digital content item for transmission to a receiving device. In some embodiments, temporary-use digital content items may be preconfigured by sponsoring device 101 and/or sponsoring service 105 and operations of block 503 need not be done in real-time. In some embodiments, temporary-use digital content items may be configured in real-time, in response to individual requests for digital content. Configuring temporary-use digital content items may comprise combining a selected digital content item with executable instructions, or otherwise placing or transmitting the selected digital content item in a form that enforces temporary use of the selected digital content at a receiving device.

In some embodiments, block 503 may be configured to combine the selected digital content with an authenticator, wherein the authenticator is configured for execution at a receiving device. In some embodiments, block 503 may be configured to define a required relationship property for use by an authenticator, e.g., authenticator 106, as authenticator 106 executes at receiving device 100, and to combine the relationship property with the selected digital content. In some embodiments, block 503 may configured to combine the selected digital content with an instruction for receiving device 100 to load and execute an auxiliary operating system, and to load and execute the digital content item in the auxiliary operating system, and optionally to load and execute authenticator 106 in the auxiliary operating system.

In some embodiments, block 503 may be configured to generate and a screen feed comprising the requested digital content item. For example, block 503 may be configured to open an auxiliary operating system, to load and execute the digital content item in the auxiliary operating system, and to send a screen feed associated with the auxiliary operating system to receiving device 100. Also, in some embodiments sponsoring service 105 may be configured to load software at sponsoring device 101, the software configured to receive and interact with digital content displayed at receiving device 100. Block 503 may be followed by block 504.

In "Send Temporary-use Digital Content" block 504, sponsoring service 105 may be configured to send selected temporary-use digital content, as configured in block 503, to receiving device 100. As noted herein, sending selected temporary-use digital content may comprise receiving by sponsoring device 101 a request for selected temporary-use digital content, and in response to the request, sending by sponsoring device 101 the selected temporary-use digital content item to a receiving device 100 associated with the received request, wherein the temporary-use digital content item comprises digital content that is displayable at receiving device 100 when a relationship property defining a relationship between receiving device 100 and sponsoring device 101 allows. The relationship property may allow displaying digital content for example when the relationship property indicates that receiving device 100 is one or more of: directly connected to sponsoring device 101, connected to a local LAN comprising sponsoring device 101, and/or within a predefined maximum distance from sponsoring device 101. The relationship property may disallow displaying digital content and the digital content may not be displayable at receiving device 100 for example when the relationship property indicates that receiving device 100 is one or more of: not directly connected to sponsoring device 101, not connected to a LAN comprising sponsoring device 101, and/or not within a predefined maximum distance from sponsoring device 101. Sending temporary-use digital content may comprise serializing and sending digital content via wired or wireless communication link 150. Block 504 may be followed by block 505.

In "Detection Support" block 505, sponsoring service 105 may be configured to support detection operations of a device that receives and displays the digital content sent from the sponsoring service 105. For example, certain detection operations may include communications between receiving device 100 and sponsoring device 101. Block 505 may be configured to receive detection communications from receiving device 100 and to respond by sending information configured to allow authenticator 106 at the receiving device 100 to determine relationship property status. Block 505 may be followed by block 506.

In "Offer" block 506, sponsoring service 105 may be configured to send, to a receiving device that is provided with temporary-use digital content, an offer to sell a permanent license for the digital content. In some embodiments, block 506 may be configured to provide a payment UI, and to receive payment information via the payment UI. In some embodiments, block 506 may be configured to execute just prior to an expected relationship termination, for example, anywhere from 1 minute to 30 minutes prior to expected relationship termination. In the case of an airplane or other transportation server, block 506 may be configured to execute prior to arrival of a vehicle at its destination. As described above, block 506 may be configured to complete payments and/or store payment information for later completion.

Figure 6:
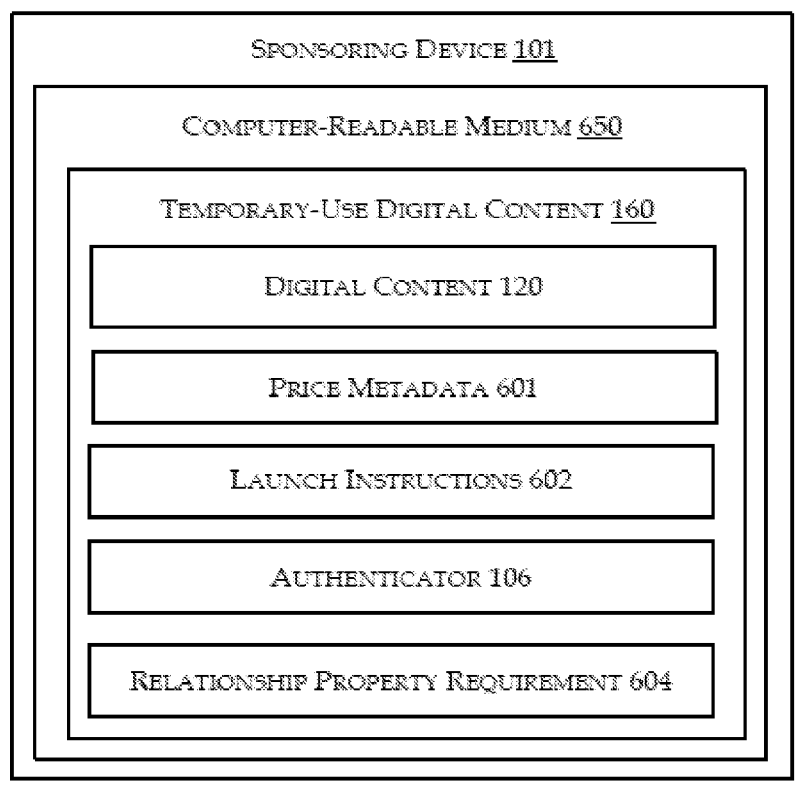
FIG. 6 is a block diagram illustrating an example sponsoring device, computer readable medium, and corresponding methods and modules configured to provide temporary-use digital content.

FIG. 6 is a block diagram illustrating an example sponsoring device 101, computer readable medium, and corresponding methods, data and modules configured to provide temporary-use digital content, arranged in accordance with at least some embodiments of the present disclosure. Example sponsoring device 101 may include one or more operations/data/modules including blocks 160, 120, 601, 602, 106, and 604. The illustrated blocks represent operations as may be performed in a method, functional modules in a sponsoring device 101, and/or instructions as may be recorded on a computer readable medium 650. The illustrated blocks may be arranged to provide data and functional operations of "Temporary-use Digital Content" at block 160, comprising "Digital Content" at block 120, "Price Metadata" at block 601, "Launch Instructions" at block 602, "Authenticator" at block 106, and "Relationship Property Requirement" at block 604.

In FIG. 6, the blocks 120, 601, 602, 106, and 604 are illustrated as being as grouped within block 160. It will be appreciated that the blocks may be re-ordered or located outside block 160 as convenient to suit particular embodiments, and that these blocks or portions thereof may be performed concurrently in some embodiments. It will also be appreciated that in some examples various blocks may be eliminated, divided into additional blocks, and/or combined with other blocks.

"Temporary-use Digital Content" block 160 may comprise digital content 120 and various other instructions and information to ensure temporary use of digital content 120 at receiving device 100. Block 160 may comprise a package that is configured for example by block 503 in FIG. 5 and sent by sponsoring device 101 to receiving device 100 via a communication link 150.

"Digital Content" block 120 may comprise any digital content such as one or more application files, videos, streams, text, multimedia, and/or audio files, as described herein. Block 120 may include a portion of a digital content item or an entire item. In some embodiments, digital content in block 120 may be encrypted, and may be decryptable by authenticator 106 and/or DRM module 107 interacting with an authenticator 106.

"Price Metadata" block 601 may comprise a number field that identifies a price for temporary-use of digital content 120. "Launch Instructions" block 602 may comprise instructions configured to load authenticator 106 to access digital content 120.

In some embodiments, block 602 may comprise instructions configured to launch an auxiliary operating system, launch authenticator 106 within the auxiliary operating system, and display digital content 120 by the auxiliary operating system so long as authenticator 106 allows. "Authenticator" block 106 may include an authenticator as described herein. It should be noted that block 106 need not be included in block 160 in embodiments including authenticator 106 natively at receiving device 100. "Relationship Property Requirement" block 604 may include any relationship property that may be required to allow displaying digital content 120 within temporary-use digital content 160. Block 604 may furthermore include for example a detection frequency requirement, and any reporting requirements describing use of digital content 120 at receiving device 100.

Figure 7:
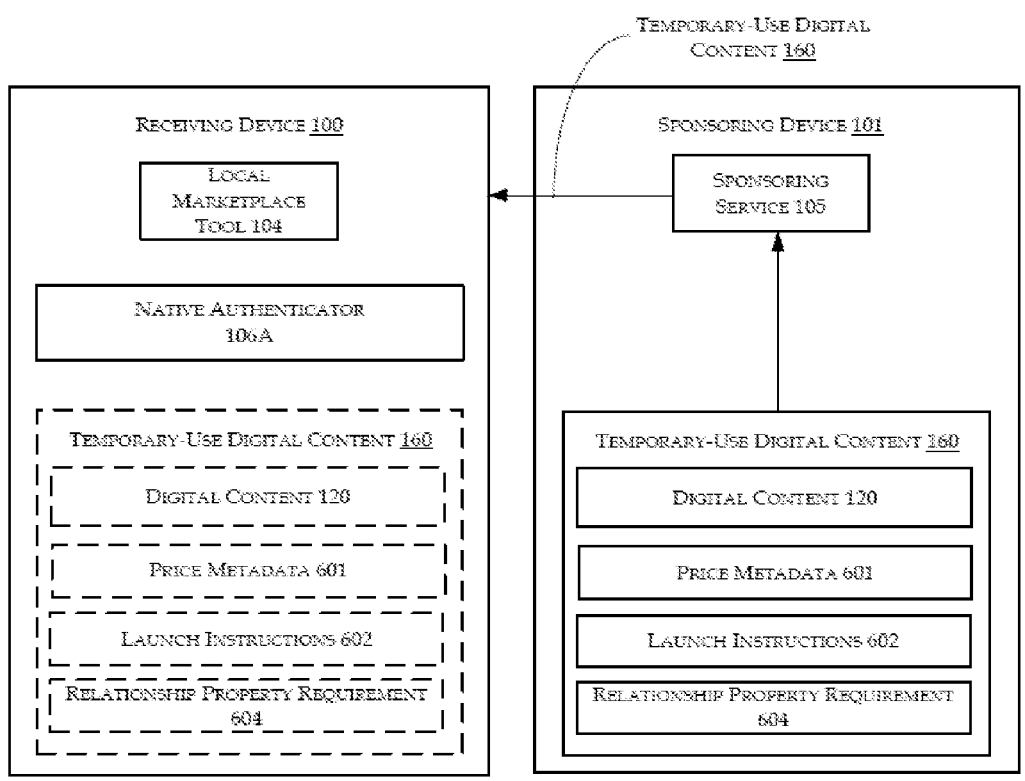
FIG. 7 is a schematic diagram illustrating example devices and device interactions in embodiments comprising a native authenticator.

FIG. 7 is a schematic diagram illustrating example devices and device interactions in embodiments comprising a native authenticator, arranged in accordance with at least some embodiments of the present disclosure. FIG. 7 includes receiving device 100 and sponsoring device 101. Receiving device 100 comprises local marketplace tool 104, a native authenticator 106A, and temporary-use digital content 160. Temporary-use digital content 160 comprises digital content 120, price metadata 601, launch instructions 602, and a relationship property requirement 604. Sponsoring device 101 comprises sponsoring service 105, and temporary-use digital content 160, comprising digital content 120, price metadata 601, launch instructions 602, and relationship property requirement 604. Temporary-use digital content 160 is shown in solid lines at sponsoring device 101, to represent a starting location of the temporary-use digital content 160. In FIG. 7, temporary-use digital content 160 is transmitted from sponsoring device 101 to receiving device 100, and temporary-use digital content 160 is illustrated in dashed lines at its destination within receiving device 100.

In embodiments according to FIG. 7, temporary-use digital content 160 need not include an authenticator, due to the presence of native authenticator 106A at receiving device 100. Launch instructions 602 may comprise instructions, decryption keys, or other data configured to launch and/or configure native authenticator 106A, so that native authenticator 106A may access digital content 120. Launch instructions 602 may furthermore contain instructions for configuring native authenticator 106A to detect relationship properties according to relationship property requirement 604.

Figure 8:
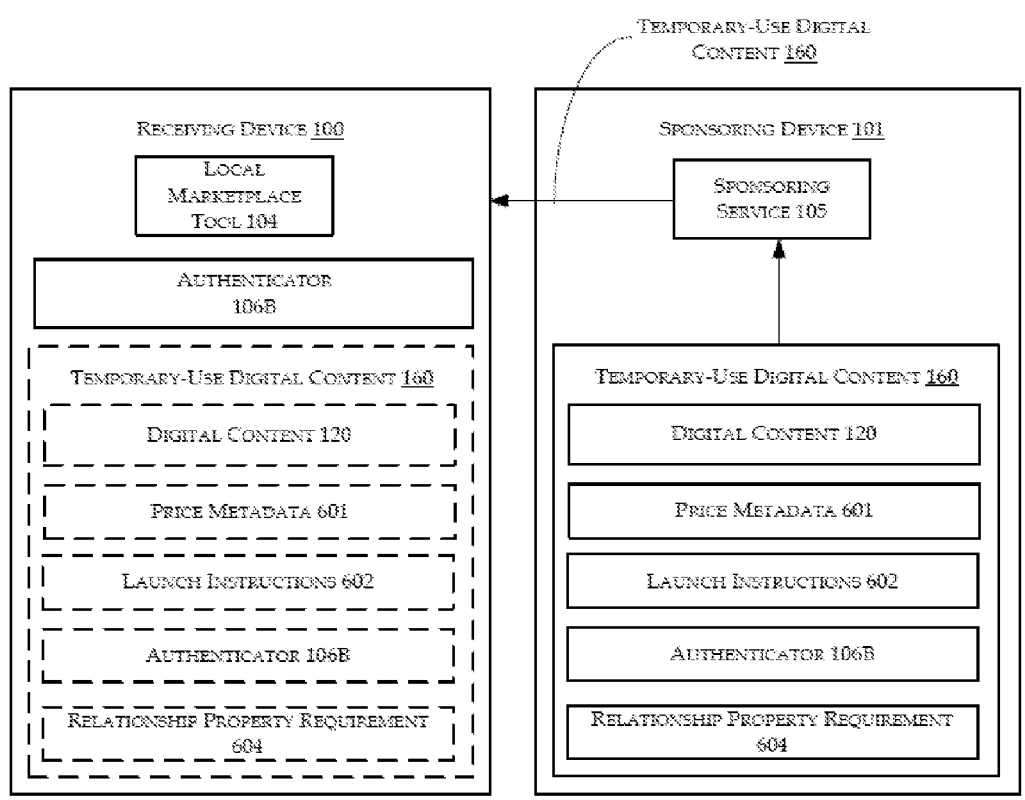
FIG. 8 is a schematic diagram illustrating example devices and device interactions in embodiments comprising a received authenticator.

FIG. 8 is a schematic diagram illustrating example devices and device interactions in embodiments comprising a received authenticator, arranged in accordance with at least some embodiments of the present disclosure. FIG. 8 includes receiving device 100 and sponsoring device 101. Receiving device 100 comprises local marketplace tool 104, a received authenticator 106B, and temporary-use digital content 160. Temporary-use digital content 160 comprises digital content 120, price metadata 601, launch instructions 602, authenticator 106B, and relationship property requirement 604. Sponsoring device 101 comprises sponsoring service 105, and temporary-use digital content 160, comprising digital content 120, price metadata 601, launch instructions 602, authenticator 106B, and relationship property requirement 604. Temporary-use digital content 160 is shown in solid lines at sponsoring device 101, to represent a starting location of temporary-use digital content 160. Temporary-use digital content 160 is transmitted from sponsoring device 101 to receiving device 100, and is illustrated in dashed lines at its destination within receiving device 100.

In embodiments according to FIG. 8, temporary-use digital content 160 includes authenticator 106B, and launch instructions 602 may be configured to launch the authenticator 106B at receiving device 100, thereby loading an instance of the received authenticator 106B at receiving device 100. Launch instructions 602 may comprise instructions, decryption keys, and/or other data configured to launch and/or configure received authenticator 106B, so that received authenticator 106B may provide access to digital content 120. Launch instructions 602 may furthermore contain instructions configuring received authenticator 106B to detect relationship properties according to relationship property requirement 604.

Figure 9:
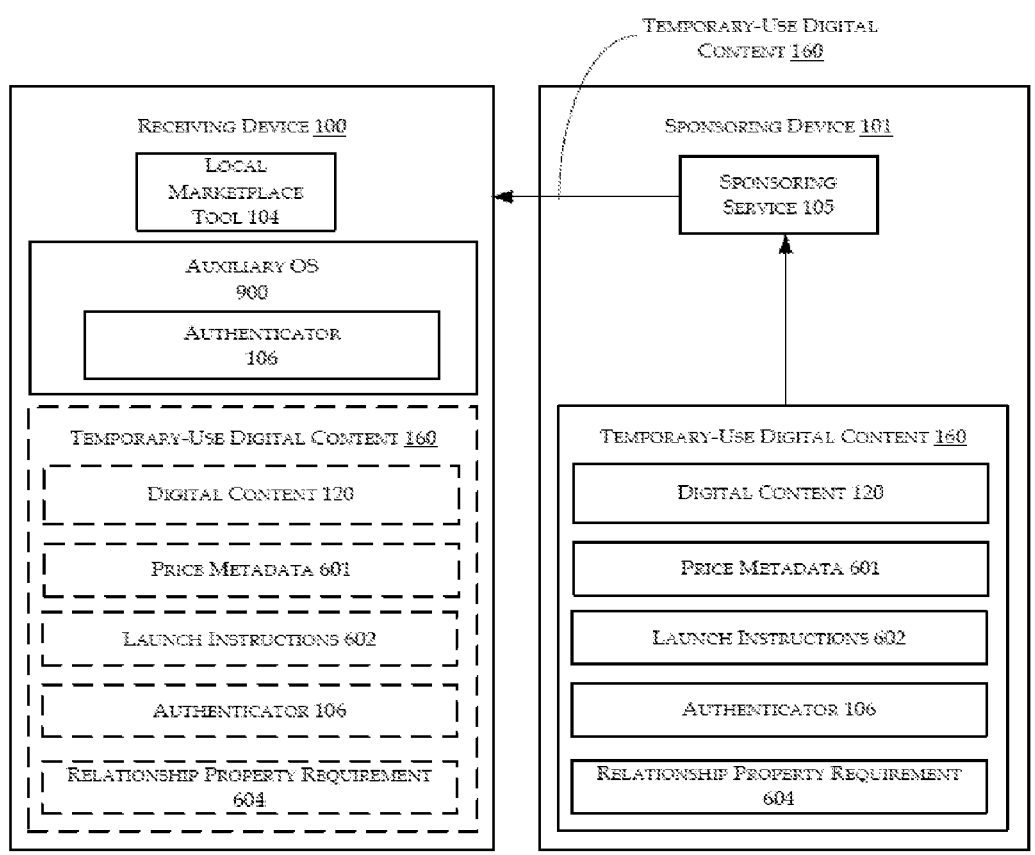
FIG. 9 is a schematic diagram illustrating example devices and device interactions in embodiments comprising an auxiliary operating system; all arranged in accordance with at least some embodiments of the present disclosure.

FIG. 9 is a schematic diagram illustrating example devices and device interactions in embodiments comprising an auxiliary operating system, arranged in accordance with at least some embodiments of the present disclosure. FIG. 9 includes receiving device 100 and sponsoring device 101. Receiving device 100 comprises local marketplace tool 104, an auxiliary OS 900, and temporary-use digital content 160. Auxiliary OS 900 comprises authenticator 106. Temporary-use digital content 160 comprises digital content 120, price metadata 601, launch instructions 602, authenticator 106, and relationship property requirement 604. Sponsoring device 101 comprises sponsoring service 105 and temporary-use digital content 160, comprising digital content 120, price metadata 601, launch instructions 602, authenticator 106, and relationship property requirement 604. Temporary-use digital content 160 is shown in solid lines at sponsoring device 101, to represent a starting location of temporary-use digital content 160. Temporary-use digital content 160 is transmitted from sponsoring device 101 to receiving device 100, and is illustrated in dashed lines at its destination within receiving device 100.

In embodiments according to FIG. 9, temporary-use digital content 160 may or may not include authenticator 106, depending for example upon whether there is a native authenticator at receiving device 100. Launch instructions 602 may be configured to launch auxiliary OS 900 and to launch authenticator 106 (either native or received) within OS 900. Launch instructions 602 may comprise instructions, decryption keys, and/or other data configured to launch and/or configure authenticator 106, so that authenticator 106 may access digital content 120. Launch instructions 602 may furthermore contain instructions configuring authenticator 106 to detect relationship properties according to relationship property requirement 604.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to: physically connectable and/or physically interacting components; wirelessly connectable and/or wirelessly interacting components; and/or logically connectable and/or logically interacting components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A receiving computing device configured to receive and use digital content from a sponsoring device, comprising:
   a processor;
   a memory;
   an authenticator loadable into the memory and executable by the processor of the receiving computing device, wherein the authenticator is configured to allow and disallow display, at the receiving computing device, of digital content received from the sponsoring device and included at the receiving computing device;
   wherein the authenticator at the receiving computing device is configured to:
      detect a relationship property defining a relationship between the receiving computing device and the sponsoring device;
      allow displaying the received digital content by the receiving computing device when the relationship property indicates that the receiving computing device is one or more of:
         directly connected to the sponsoring device;
         connected to a Local Area Network (LAN) comprising the sponsoring device; or
         within a predefined maximum distance from the sponsoring device; and
      disallow displaying the received digital content by the receiving computing device when the relationship property indicates that the receiving computing device is one or more of:
         not directly connected to the sponsoring device;
         not connected to the LAN comprising the sponsoring device; or
         not within the predefined maximum distance from the sponsoring device.

2. The receiving computing device of claim 1, wherein the received digital content comprises a multi-user application that enables interaction between a user of the receiving computing device and a user of the sponsoring device.

3. The receiving computing device of claim 1, wherein the received digital content comprises an application, video file, audio file, file stream, or text file.

4. The receiving computing device of claim 1, wherein the authenticator is configured to apply one or more of a time limit and a usage count limit, and to disallow displaying the received digital content after the time limit or usage count limit has elapsed.

5. The receiving computing device of claim 1, wherein the authenticator is configured to allow loading and executing the received digital content in the receiving computing device when the relationship property indicates that the receiving computing device remains connected to a same LAN comprising the sponsoring device as a LAN used when first receiving the digital content by the receiving computing device from the sponsoring device.

6. The receiving computing device of claim 1, wherein the authenticator is configured to detect Global Positioning System (GPS) locations of the receiving computing device and the sponsoring device, and to compare the GPS locations to determine whether the receiving computing device is within a predefined maximum distance from the sponsoring device.

7. The receiving computing device of claim 1, wherein the receiving computing device is configured to receive the received digital content and the authenticator from the sponsoring device, and wherein the receiving computing device is configured to load and execute the authenticator in response to an instruction received from the sponsoring device along with the received digital content.

8. The receiving computing device of claim 1, further comprising an operating system executable by the processor, and wherein the operating system includes the authenticator.

9. The receiving computing device of claim 1, further comprising an operating system executable by the processor, and wherein the operating system includes a local marketplace tool configured to discover, aggregate, and display digital content items available from one or more sponsoring devices for which one or more relationship properties defining relationships between the receiving computing device and the one or more sponsoring devices allow displaying the digital content items by the receiving computing device.

10. The receiving computing device of claim 1, wherein the received digital content is encrypted, and wherein the authenticator is configured to allow displaying the received digital content by validating a decryption key using the relationship property.

11. The receiving computing device of claim 1, wherein the receiving computing device is configured to load and execute an auxiliary operating system, and to load and execute the received digital content in the auxiliary operating system, in response to an instruction received from the sponsoring device along with the received digital content.

12. The receiving computing device of claim 1, wherein the receiving computing device is configured to receive, from the sponsoring device, a screen feed comprising the received digital content.

13. The receiving computing device of claim 1, wherein the receiving computing device is configured to send digital content interaction instructions to the sponsoring device for interactions between a user of the receiving computing device and the received digital content at the receiving computing device.

14. The receiving computing device of claim 1, further comprising a payment manager configured to display temporary-use price metadata for the received digital content, and to receive payment information in consideration for displaying the received digital content by the receiving computing device.

15. The receiving computing device of claim 1, wherein the authenticator is configured to provide a User Interface (UI) to prompt acquisition of the received digital content from a source other than the sponsoring device, after displaying the received digital content by the receiving computing device is disallowed.

16. A non-transitory computer readable medium having computer executable instructions configured to allow and disallow using a digital content item by a receiving computing device, the computer readable medium comprising:
  instructions implementing an authenticator at the receiving computing device, wherein the authenticator is configured to allow and disallow display, at the receiving computing device, of a digital content item received from a sponsoring device and included at the receiving computing device;
  wherein the authenticator at the receiving computing device is configured to:
    detect a relationship property defining a relationship between the receiving computing device and the sponsoring device;
    allow displaying the received digital content item by the receiving computing device when the relationship property indicates that the receiving computing device is one or more of:
      directly connected to the sponsoring device;
      connected to a Local Area Network (LAN) comprising the sponsoring device; or
      within a predefined maximum distance from the sponsoring device; and
    disallow displaying the received digital content item by the receiving computing device when the relationship property indicates that the receiving computing device is one or more of:
      not directly connected to the sponsoring device;
      not connected to the LAN comprising the sponsoring device; or
      not within the predefined maximum distance from the sponsoring device.

17. A method for receiving and using digital content, comprising:
  receiving, by a receiving computing device, digital content from a sponsoring device, whereby the receiving computing device includes the received digital content;
  detecting, by the receiving computing device, a relationship property defining a relationship between the receiving computing device and the sponsoring device;
  allowing displaying the received digital content by the receiving computing device when the relationship property indicates that the receiving computing device is one or more of:
    directly connected to the sponsoring device;
    connected to a Local Area Network (LAN) comprising the sponsoring device; or
    within a predefined maximum distance from the sponsoring device; and
  disallowing displaying the received digital content by the receiving computing device when the relationship property indicates that the receiving computing device is one or more of:
    not directly connected to the sponsoring device;
    not connected to the LAN comprising the sponsoring device; or
    not within the predefined maximum distance from the sponsoring device.

18. The method of claim 17, further comprising discovering, by the receiving computing device, digital content item information identifying one or more digital content items available from one or more sponsoring devices for which one or more relationship properties allow displaying corresponding digital content items by the receiving computing device.

19. The method of claim 18, further comprising aggregating, by the receiving computing device, the digital content item information and displaying the digital content item information in a User Interface (UI) for review and selection of digital content by a user of the receiving computing device.

20. The method of claim 19, further comprising retrieving, by the receiving computing device, a digital content item selected via the UI.

21. The method of claim 17, further comprising displaying a User Interface (UI), by the receiving computing device, wherein the UI is configured to prompt acquisition of the received digital content from a source other than the sponsoring device.

22. The method of claim 17, further comprising receiving, by the receiving computing device, an authenticator from the sponsoring device, and loading and executing the authenticator by the receiving computing device.

* * * * *

UNITED STATES PATENT AND TRADEMARK OFFICE
CERTIFICATE OF CORRECTION

PATENT NO.        : 9,015,859 B2
APPLICATION NO.   : 13/635632
DATED             : April 21, 2015
INVENTOR(S)       : Shaikh et al.

Page 1 of 1

It is certified that error appears in the above-identified patent and that said Letters Patent is hereby corrected as shown below:

In the Specification

In Column 1, Line 8, delete ""35U.S.C. §371"" and insert -- "35 U.S.C. § 371" --, therefor.

Signed and Sealed this
Twenty-ninth Day of September, 2015

Michelle K. Lee
*Director of the United States Patent and Trademark Office*